April 14, 1970     E. BREUNING     3,505,735

DEVICE FOR THE PRODUCTION OF YOGURT

Filed July 3, 1968     3 Sheets-Sheet 1

INVENTOR
ERNST BREUNING
BY
ATTORNEYS

April 14, 1970     E. BREUNING     3,505,735
DEVICE FOR THE PRODUCTION OF YOGURT Filed July 3, 1968     3 Sheets-Sheet 2

INVENTOR
ERNST BREUNING
BY *Menglow and Toren*
ATTORNEYS

April 14, 1970 E. BREUNING 3,505,735
DEVICE FOR THE PRODUCTION OF YOGURT
Filed July 3, 1968 3 Sheets-Sheet 3

INVENTOR.
ERNST BREUNING

3,505,735
DEVICE FOR THE PRODUCTION OF YOGURT
Ernst Breuning, 6 Fruhlingsweg,
7016 Gerlingen 2, Germany
Filed July 3, 1968, Ser. No. 742,309
Claims priority, application Germany, July 6, 1967,
1,582,952
Int. Cl. A01j 11/00; A23c 9/12, 23/00
U.S. Cl. 31—2                                        20 Claims

ABSTRACT OF THE DISCLOSURE

A device for the production of yogurt includes a chamber and a support, for stacked yogurt containers, positioned in the chamber and dividing the chamber into two separate compartments. The support has openings, through a support surface engageable with the bottom side of the stack of containers, communicating with both compartments, the two compartments being otherwise airtightly sealed from each other. A blower circulates air through the compartments and the openings, and a heat exchanger is positioned in the air flow path to influence the temperature of the circulated air. The area of the openings corresponds to the cross section of the stacked containers.

BACKGROUND OF THE INVENTION

Devices for the production of yogurt are known in which heating and cooling of the air is effected partly in the chamber proper and partly outside the chamber. There is also known a chamber wherein, by special means, there is obtained an air flow which is uniformly distributed over the entire cross section of the yogurt container space. This known chamber has, however, the disadvantage that the insertion of an entire stack of yogurt containers is extremely difficult and cumbersome. This is due to the fact that, for the intended purpose, there must be an extremely great distance between the walls of the yogurt container space and the guide plates or vanes for the air flow, which plates or vanes are used in the known chamber.

SUMMARY OF THE INVENTION

This invention realtes to devices for the production of yogurt and, more particularly, to an improvement in such devices of the type including a chamber for stacked yogurt containers, air blowing means, and heat exchanger means for influencing the air temperature.

The objective of the present invention is to overcome the disadvantages of known devices, and furthermore to guide the air flow through the chamber and a positive manner such that air will flow as uniformly as possible past the yogurt containers.

In accordance with the invention, the chamber for the stacked yogurt containers is sub-divided by a supporting device into two compartments which are separated from each other in an airtight manner. The separation of the chamber into two airtight compartments has, however, one exception, in that there is an opening, or a surface provided with openings, arranged at the lower or bottom side of the yogurt container, or the stack of yogurt containers. This opening essentially corresponds to the cross section of the container or the stack.

Due to the sub-division of the chamber into two compartments which are separated from each other in an airtight manner, and which are in communication with each other only through the opening or openings, the air is guided in a forced or positive manner so that it must pass the yogurt containers or, if several containers are used, it must flow between these containers. The air can flow off or be discharged only through the opening provided therefor in the wall separating the compartments. The construction thus assures that the yogurt container or containers are washed by the air in a uniform manner and thus are subjected to a uniform air temperature.

In a second embodiment of the invention, the arrangement includes superposed supporting frames receiving the yogurt containers and which form a stack of yogurt containers, these supporting frames having the same box-like configuration. In this embodiment of the invention, the lateral walls of the yogurt container or containers of the stack of yogurt, or of the supporting frames, are provided at least partially with openings for the passage of air. The containers, the stacks, or the supporting frames are mounted on a perforated plate wherein the holes or perforations have cross sections increasing from the periphery toward the center of the plate.

In this embodiment of the invention, the air flow enters through the slots of the lateral walls, moves past the yogurt containers, and flows through the holes of the plate carrying the stacks and into the other compartment. By arranging the perforations or holes in a stepwise manner toward the center, there is obtained an air flow which is uniform over the cross section of the supporting plate. For the air which flows off through the openings situated near the periphery of the plate, the flow path through the stack is, of course, very short. However, due to the smaller cross section of these flow passages near the periphery of the plate, the flow resistance is correspondingly great. When the flow path area increases through the yogurt stack, the cross sections of the associated flow passages of the plate become correspondingly larger, and thus the flow resistance at the same time becomes smaller. In this manner, flow of the air past the yogurt stack on the outer surface thereof is prevented, and flow only through those flow passages situated nearer the periphery of the plate is also prevented. Instead, the air is forced to flow through the entire stack of yogurt or yogurt containers.

An object of the invention is to provide an improved device for the production of yogurt.

Another object of the invention is to provide such a device including a support, for the yogurt, positioned in a chamber and sub-dividing the chamber into two compartments.

A further object of the invention is to provide such a device in which the support has at least one opening, through a support surface egageable with the bottom side of a stack of yogurt containers, communicating with both compartments.

Still another object of the invention is to provide such a device in which the two compartments are airtightly separated from each other except for such opening or openings.

A further object of the invention is to provide such a device in which the disadvantages of known devices are obviated.

Yet, another object of the invention is to provide such a device in which the air flow in the yogurt chamber is guided in a positive manner to flow as uniformly as possible past a yogurt container or containers.

Another object of the invention is to provide such a device in which the yogurt container or containers are washed by the air in a uniform manner and thus subjected to a uniform air temperature.

A further object of the invention is to provide such a device in which air flow past the exterior of a stack of yogurt containers is prevented.

For an understanding of the principles of the invention, reference is made to the following description of typical embodiments thereof as illustrated in the accompanying drawings.

DESCRIPTION OF THE PREFERRED EMBODIMENTS

Figures 1, 2:
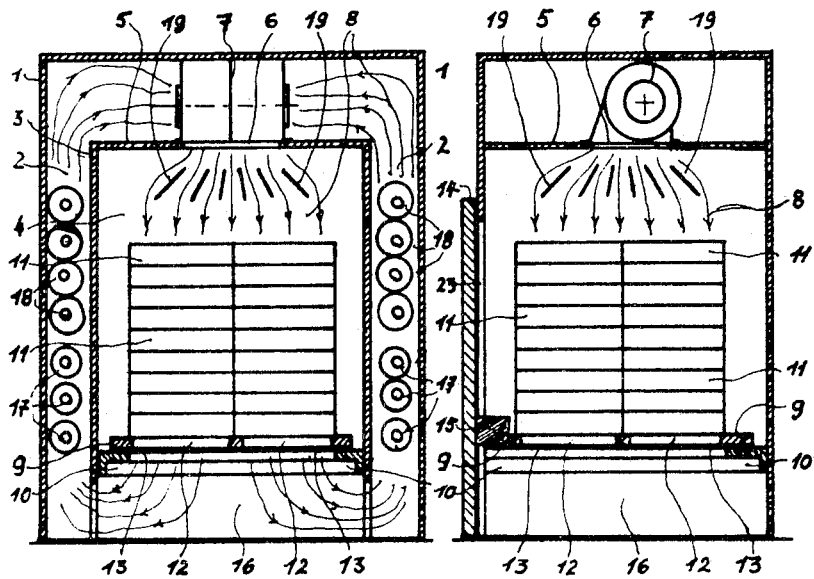
FIG. 1 is a vertical sectional view through a device embodying the invention and in a plane parallel to a door opening therein.
FIG. 2 is a vertical sectional view through a device embodying the invention, in a plane perpendicular to the door opening.

Referring first to FIGS. 1 and 2, a device for the production of yogurt, embodying the invention, comprises a chamber defined by lateral walls 1 forming the outer limits of air channels 2 which are restricted or limited toward a yogurt space 4 by means of intermediate walls 3. Yogurt space 4 is closed on top by a ceiling 5 having an opening 6 through which radial blower or venting means 7 can direct a flow of air into yogurt space 5. The venting means or blowers may be driven by a V-belt drive.

A yogurt supporting device 9 is constructed in the form of a frame-like pallet, which is mounted in yogurt space 4 on the supporting means 10 in the form of supports. Supporting frames 11, which receive the yogurt containers, are arranged on supporting device 9 in a stack-like manner. Below the supporting frames 11, supporting device 9 is formed with air passage openings 12.

Supporting device 9 and the support means 10 have plane horizontal surfaces 13 for interengagement to serve as a sealing surface or surfaces through which and between which no air can penetrate. Supporting means or supports 10 are connected in an airtight manner with intermediate walls 3. As can be best seen in FIG. 2, on the front wall of the chamber and over the width or the door opening 14, no support elements 10 are provided. Instead the door 14 has, throughout the width of the opening closed thereby, an air blocking or sealing member in the form of a highly elastic rubber ledge 15.

By the arrangement thus far described, it is assured that the air flow 8, provided by the blower means 7 through the opening 6, must flow, in its entire magnitude, through supporting frames 11, since the air flow 8 can reach the space or compartment 16 below support device 9 only through the air exit or passage openings 12. The air flows from compartment 16 through the air channels 2 in which there are arranged air heating means 17 and air cooling means 18, and thus returns to the venting, aerating, or air flow creating means 7.

A chamber and a support, constructed as described and in accordance with the invention, provides for an extremely convenient, rapid charging and emptying of the chamber without any danger to the operator since, on the one hand, the free space between the side walls of supporting frames 11 and intermediate walls 3 is completely free and, on the other hand, the outer dimensions of support 9 are maintained substantially smaller than the inner dimensions of yogurt space 4. In accordance with the invention, it is also possible to replace the air blocking members fixedly or rigidly positioned, and which are active in the horizontal lane, by movable air blocking members. This may be of advantage if the support for the yogurt containers is not mounted on carriers, but stands on its own feet.

Of course, it is possible to construct the chamber in such a manner that it receives, at the same time, several correspondingly smaller transporting devices with their supporting frames. Between opening 6 and the uppermost of supporting frames 11, guide plates or vanes 19 are arranged to direct air flow 8 in a uniform manner.

Figures 3, 4:
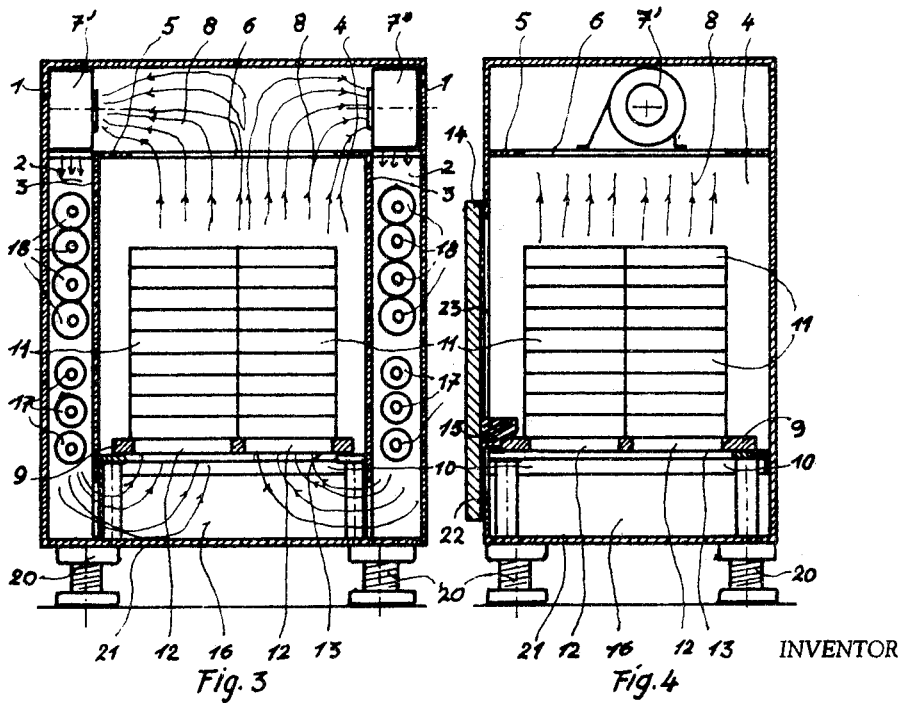
FIGS. 3 and 4 are vertical sectional views, corresponding respectively to FIGS. 1 and 2, but illustrating another embodiment of the invention.

Referring now to the embodiment of the invention shown in FIGS. 3 and 4, this differs from the embodiment of FIGS. 1 and 2 in that air flow 8 is directed upwardly through openings 12 and over the supporting frames 11. For this purpose, two radial blowers 7' and 7" are used. This embodiment has the great advantage that air flow 8 does not impinge on the cover lids of the yogurt containers which are situated in supporting frames 11, and which would shake the containers which may be damaging to yogurt formation. In the embodiment of FIGS. 3 and 4, with the air flow 8 being directed upwardly, the air flow impinges on the bottom ends of supporting frames 11 so that, in this manner, shaking of the containers is readily prevented.

Furthermore, the entire chamber preferably stands on four pillar-like or column-like feet or legs 20, which may be adjustable as to height and which have a height of from 10 to 50 cm. As distinguished from the embodiment of FIGS. 1 and 2, the chamber of FIGS. 3 and 4 has its own bottom closure wall. Between the lower edge of support 9 and the lower boundary 22 of door opening 23, there is a space of about 10 cm. This makes it possible to charge the chamber, even with its own bottom wall 21, using a well known fork lift truck to stack supporting frames 11 in the chamber and to remove supporting frames 11 from the chamber.

The chamber closure or door 14 moves downwardly to a closed position which is unobjectionable since door 14 does not have to effect or provide an airtight sealing or closing in cooperation with bottom wall 21. In addition, the position or orientation of the chamber is independent of slanting or inclination of its support surface and any unevenness which may be present in the support surface, due to the adjustability of the feet or legs 20.

Inasmuch as the chamber has its own bottom closure 21, the usual heat insulation may be provided. Door 14 is positioned at the front wall of the chamber in such a manner that it can be folded upwardly or can be tilted or rocked upwardly. The particular advantage of such an arrangement is that the opened door does not project in an obstructing manner into the supply path which must be provided between several chambers or compartments.

The air flow creating means, such as the blower or blowers, causes an air flow 8 whose velocity $v$, in meters per second, within supporting frames 11 has a value between $v_{m/sec} > h_{stack}^{.5}$ and $v_{m/sec} < h_{stack}^{.20}$, wherein $h_{stack}$ is the total height of supporting frames 11 superposed in a stack. As a result, there is obtained, with respect to yogurt incubation procedures where in the temperature of the yogurt milk during the incubation period is constantly adjusted to be from 45° C. to 38° C., a temperature differential, between the uppermost and lowermost containers, maintained within desired limits of, for example, 2° C.

Figures 5, 6:
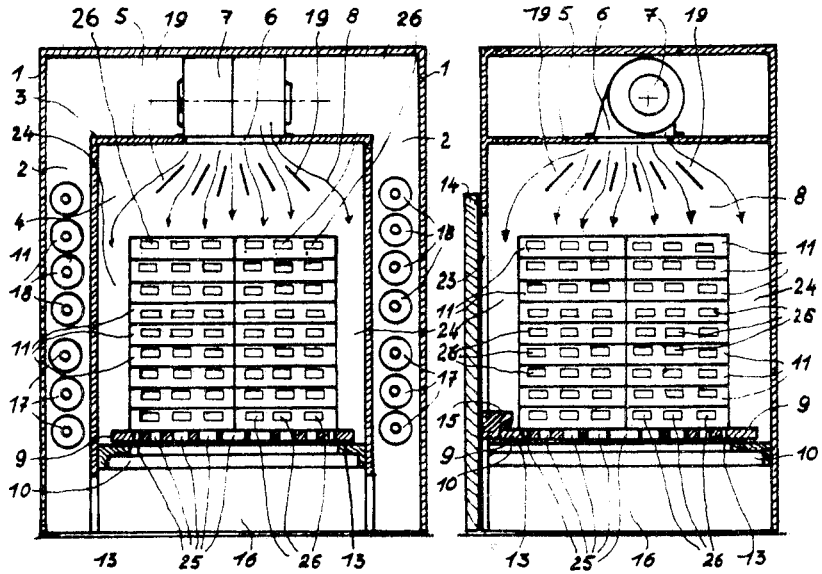
FIGS. 5 and 6 are vertical sectional views, corresponding respectively to FIGS. 1 and 2, but illustrating a third embodiment of the invention.

Referring now to FIGS. 5 and 6, supporting frames 11 which contain the containers 27 (FIG. 11) are stacked on support 9. Below supporting frames 11, support 9 is formed with holes 25. Air flow 8, provided by the air flow creating means, such as the venting means or blowers 7, is directed through opening 6 and the greater portion of the air flow flows vertically through the stacked supporting frames 11. However, a portion of the air flow flows through the free space 24 between intermediate walls 3 and the outer walls of supporting frames 11. From space 24, the air enters through the lateral air passage openings 26 into supporting frames 11, in order to flow past containers 27 positioned in supporting frames 11. The air flow then exits from the stacked supporting frames through the holes or apertures 25 in support 9.

In this arrangement, the lateral inflow into the lowermost of supporting frames 11 is the largest, since there the pressure differential, between free space 24 and the interior of supporting frames 11, is largest, due to the pressure differential or pressure drop prevailing in the interior of the supporting frames 11. There is thereby obtained that the containers 27 situated in the lower supporting frames 11 are washed at least partially by air which has the temperature of the air entering the stack.

Due to the particular cross sectional dimensions of apertures or holes 25 in support 9, the air laterally entering the entire stack of supporting frames acts not only on those containers in the zones of air passage openings 26, but also on those containers which are situated in the center of the stack.

Figures 7, 8:
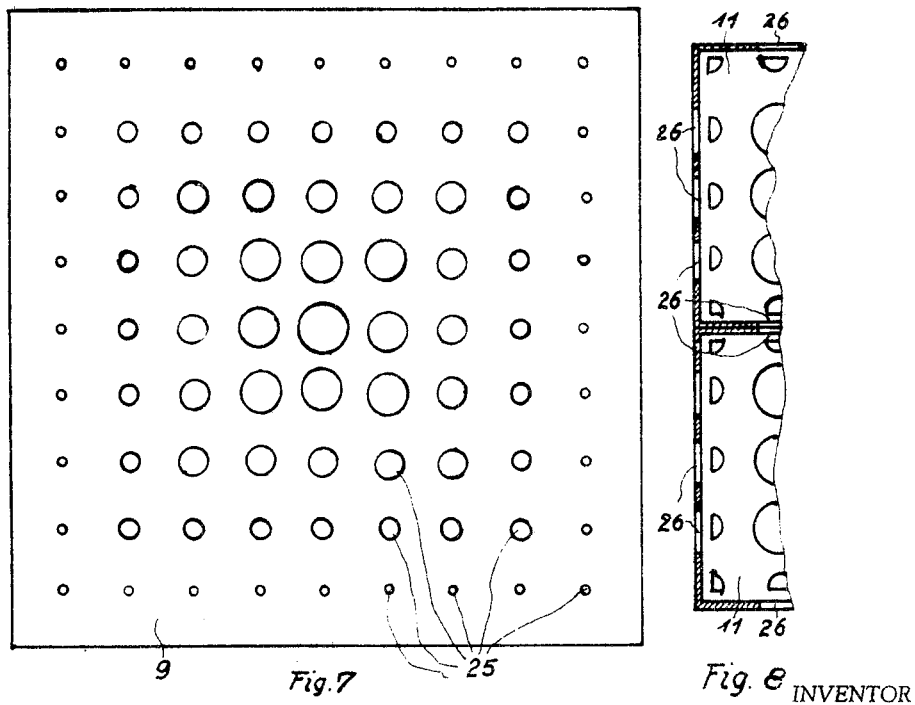
FIG. 7 is a plan view of a perforated yogurt support plate.
FIG. 8 is a horizontal sectional view, partially broken away, through adjacent supporting frames which can be used with the perforated plate of FIG. 7.

FIGS. 5 through 8 show an embodiment of the invention in which twelve passages or openings 26 are provided in each supporting frame 11. In this embodiment, the flow passage openings 26 are uniformly distributed around their circumferences of supporting frames 11, and thus also around the circumferences or peripheries of the stacked supporting frames. This distribution corresponds to the lateral distribution of holes 25 as illustrated in FIG. 7. It will be noted that the cross sectional area of openings 25 decreases from the center of the stack toward the peripheral edges thereof, which has the effect that air entering the stack laterally cannot simply flow off vertically within the outer walls of the supporting frames 11 and through the supporting frames, but must flow also in horizontal directions toward the center of the stack. The ratio of the largest cross sectional area to the smallest cross sectional area of holes 25 is chosen to be about equal to the number of stacked layers of supporting frames 11.

Figure 9:
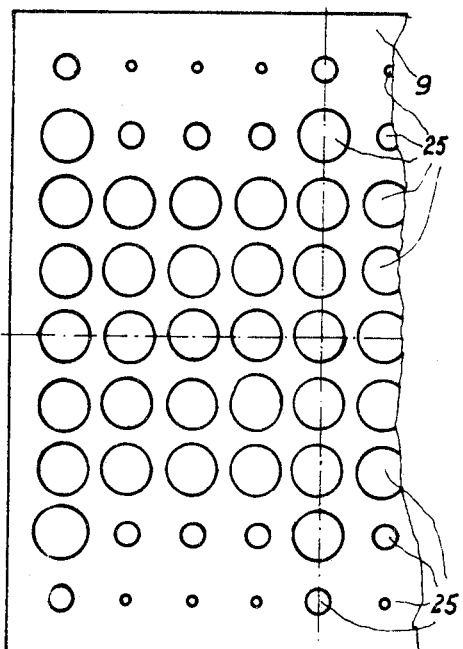
FIG. 9 is a partial plan view of another form of perforated plate useable with the invention.
Figure 10:
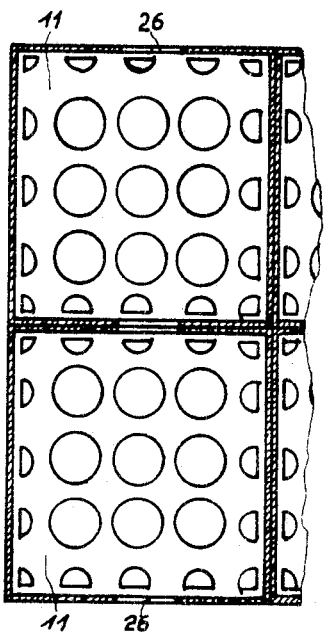
FIG. 10 is a horizontal sectional view, partly broken away, of adjacent supporting frames which can be used with the perforated plate of FIG. 9.

It is also possible to design or arrange air passage openings 26 in such a manner that they can be used as grip openings, and such an arrangement is shown in FIGS. 9 and 10. In constant correspondence with two opposing flow passage openings 26 of supporting frames 11, support 9 has, on only two sides, zones with holes 25 which have a slightly decreased cross sectional area.

To the extent that the walls of the containers should exert a high heat damming and protecting action during transportation of the finished yogurt, it is advantageous to arrange the air passage openings 26 in the vicinity of the upper edges of the side walls of supporting frames 11. An additional advantageous arrangement for this purpose is to provide that the normals of the centers of air passage openings 26 fall into the center between the vessels or containers 27, as shown in FIG. 11.

Figure 11:
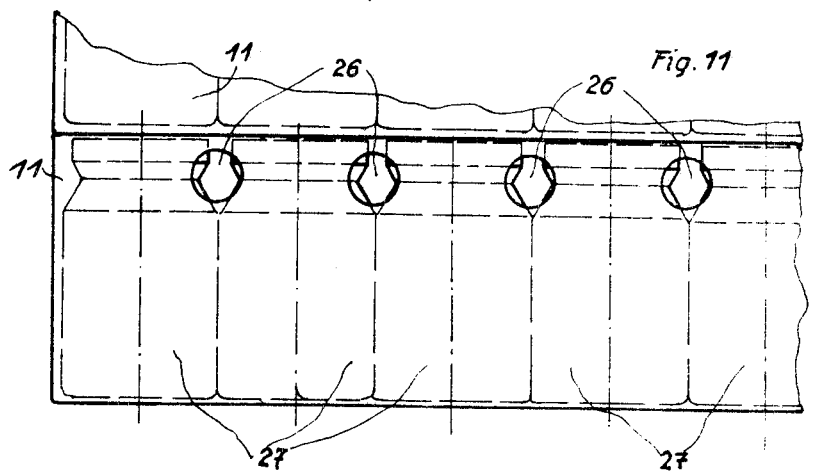
FIG. 11 is a side elevation view illustrating an exemplary arrangement and configuration of air passage openings in the walls of the supporting frames.

Furthermore, it is advantageous, for this purpose, to make the cross sectional area of the air passage openings 26 equal to or smaller than the cross sectional area of the flow passages extending horizontally between two containers 27, as shown also in FIG. 11.

What is claimed is:

1. A device for the production of yogurt, comprising in combination, means forming a chamber; a support, for stacked yogurt containers, positioned in said chamber and dividing said chamber into two separate compartments, said support having at least one opening, through a support surface engageable with the bottom side of the stack of containers, communicating with both compartments, and the two compartments being otherwise air tightly sealed from each other; air flow creating means operable to circulate air along a flow path extending serially through said compartments and said openings; and at least one heat exchanger positioned along said air flow path and influencing the temperature of the circulated air; the area of said openings corresponding to the cross section of the stacked containers.

2. A device for the production of yogurt, as claimed in claim 1, in which said support is in the form of a pallet; said chamber including supporting means on which said pallet is positioned; said pallet having sealing surfaces cooperating with corresponding sealing counter surfaces of said chamber.

3. A device for the production of yogurt, as claimed in claim 2, in which said sealing counter surfaces are movable relative to said chamber.

4. A device for the production of yogurt, as claimed in claim 3, in which said sealing counter surfaces are tiltable relative to said chamber.

5. A device for the production of yogurt, as claimed in claim 2, in which said sealing counter surfaces are provided on said supporting means.

6. A device for the production of yogurt, as claimed in claim 2, in which said supporting means comprises plural support means in said chamber for respective adjacently positioned pallets.

7. A device for the production of yogurt, as claimed in claim 1, in which said means forming a chamber includes a bottom closure wall of said chamber.

8. A device for the production of yogurt, as claimed in claim 7, including legs supporting said bottom wall; the spacing between said bottom wall and said support having a value such as to provide for the insertion of a stacking device into said chamber.

9. A device for the production of yogurt, as claimed in claim 7, in which said chamber has a discharge opening in a side wall thereof, said bottom wall sloping toward said discharge opening.

10. A device for the production of yogurt, as claimed in claim 1, in which said chamber has an opening in a sidewall thereof; and a door closing said opening and mounted on said side wall for upward swinging to provide access to said chamber through said opening.

11. A device for the production of yogurt, as claimed in claim 1, in which said air flow creating means directs the air flow upwardy through said stacked yogurt containers.

12. A device for the production of yogurt, as in claim 1, in which the velocity ($v$) of the air flow in said chamber, in meters per second, has a value between $v_{m/sec} > h_{stack}^{.5}$ and $v_{m/sec} < h_{stnck}^{.20}$, wherein $h_{stack}$ is the total height of the stack in meters.

13. A device for the production of yogurt, as claimed in claim 1, including guide vanes positioned in said air flow and operable to provide a uniform configuration of said air flow.

14. A device for the production of yogurt, as claimed in claim 1, in which the yogurt containers are positioned in box-like supporting frames which are superimposed one upon the other in said chamber in an airtight manner; the bottom walls of said supporting frames having openings for the passage of air.

15. A device for the production of yogurt, as claimed in claim 1, in which said yogurt containers are positioned in support frames which are stacked on each other on said support; the side walls of said support frames being formed with air passage openings; said support comprising a perforated plate in which the respective cross sectional areas of the perforations increase from the periphery of said perforated plate toward the center thereof.

16. A device for the production of yogurt, as claimed in claim 15, in which the ratio of the cross sectional area of the largest perforation in said perforated plate to the cross sectional area of the smallest perforation therein substantially corresponds to the number of stacked supporting frames.

17. A device for the production of yogurt, as claimed in claim 15, in which the normals to the centers of said walls of said supporting frames are formed, at least partially, as grip openings.

18. A device for the production of yogurt, as claimed in claim 15, in which said air passage openings are arranged near the upper edges of the side walls of said support frames.

19. A device for the production of yogurt, as claimed in claim 15, in which the normal to the centers of said air passage openings extend between adjacent containers in said support frames.

20. A device for the production of yogurt, as claimed in claim 19, in which the cross sectional area of said air passage openings is not greater than the cross section of the associated air passage extending horizontally between adjacent containers in said supporting frames.

References Cited

UNITED STATES PATENTS

| | | | |
|---|---|---|---|
| 1,943,575 | 1/1934 | Abendroth | 119—37 |
| 2,052,253 | 8/1936 | Savary | 99—59 X |
| 2,479,030 | 8/1949 | Taggart | 119—39 X |
| 2,566,453 | 9/1951 | Ketay | 119—37 |
| 3,111,574 | 11/1963 | Spini | 99—59 X |
| 3,128,190 | 4/1964 | Donay | 99—59 |

ALDRICH F. MEDBERY, Primary Examiner

U.S. Cl. X.R.

99—59; 119—39